United States Patent
Suh et al.

(10) Patent No.: US 7,548,525 B2
(45) Date of Patent: Jun. 16, 2009

(54) SYSTEM AND METHOD FOR PROVIDING HANDOVER OF A MOBILE IP TERMINAL IN A WIRELESS NETWORK

(75) Inventors: Kyung-Joo Suh, Suwon-si (KR); Young-Jun Park, Seoul (KR); Jae-Kwon Oh, Seoul (KR); Eun-Hui Bae, Seoul (KR); Hyeon-Woo Lee, Suwon-si (KR); Su-Yeul Lee, Suwon-si (KR); Young-Joo Suh, Pohang-si (KR); Woo-Jae Kim, Pohang-si (KR); Dong-Hee Kwon, Pohang-si (KR)

(73) Assignee: Samsung Electronics Co., Ltd (KR)

( * ) Notice: Subject to any disclaimer, the term of this patent is extended or adjusted under 35 U.S.C. 154(b) by 770 days.

(21) Appl. No.: 10/967,574

(22) Filed: Oct. 18, 2004

(65) Prior Publication Data

US 2005/0163080 A1 Jul. 28, 2005

(30) Foreign Application Priority Data

Oct. 18, 2003 (KR) ...................... 10-2003-0072800
Oct. 20, 2003 (KR) ...................... 10-2003-0073201

(51) Int. Cl.
*H04Q 7/00* (2006.01)
(52) U.S. Cl. .................... 370/331; 370/401; 370/332; 370/328; 455/440
(58) Field of Classification Search ................. 370/331, 370/401, 332, 328; 455/440
See application file for complete search history.

(56) References Cited

U.S. PATENT DOCUMENTS

2003/0126290 A1   7/2003  Lakshmi Narayanan et al.
2003/0225892 A1*  12/2003 Takusagawa et al. ........ 709/227
2004/0165551 A1*  8/2004  Krishnamurthi et al. .... 370/328
2004/0166861 A1*  8/2004  Trossen ...................... 455/440
2004/0196808 A1*  10/2004 Chaskar et al. ............. 370/331
2005/0147062 A1*  7/2005  Khouaja et al. ............. 370/332

FOREIGN PATENT DOCUMENTS

| JP | 2001-094572 | 4/2001 |
|----|-------------|--------|
| JP | 2003-101506 | 4/2003 |
| WO | WO 03/003639 | 1/2003 |
| WO | WO 03/049377 | 6/2003 |

* cited by examiner

*Primary Examiner*—David Q Nguyen
(74) *Attorney, Agent, or Firm*—The Farrell Law Firm, LLP

(57) ABSTRACT

Disclosed is a system for providing handover of a mobile node in a wireless network supporting Mobile IP (Internet Protocol). The mobile node sends, when handover is needed, a request for neighbor access router information to a first access router currently communicating with the mobile node, and selects, if the neighbor access router information is received, a second access router serving as a target access router using the received neighbor access router information. The first access router exchanges access router information with a neighbor access router, provides neighbor access router information to the mobile node upon receiving the neighbor access router information request from the mobile node, and redirects data to be delivered to the mobile node to the second access router to which the mobile node will be handed over. The second access router forwards data to be delivered to the mobile node, received from the first access router, to the corresponding mobile node.

13 Claims, 9 Drawing Sheets

SYSTEM AND METHOD FOR PROVIDING HANDOVER OF A MOBILE IP TERMINAL IN A WIRELESS NETWORK

PRIORITY

This application claims priority under 35 U.S.C. § 119 to an application entitled "System and Method for Providing Handover of a Mobile IP Terminal in a Wireless Network" filed in the Korean Intellectual Property Office on Oct. 18, 2003 and assigned Serial No. 2003-72800, and an application entitled "System and Method for Providing Handover of a Mobile IP Terminal in a Wireless Network" filed in the Korean Intellectual Property Office on Oct. 20, 2003 and assigned Serial No. 2003-73201, the contents of each of which are hereby incorporated by reference.

BACKGROUND OF THE INVENTION

1. Field of the Invention

The present invention relates generally to a system and method for supporting the mobility of a terminal in a wireless system employing a Mobile IP (Internet Protocol), and in particular, to a system and method for providing a handover for a Mobile IP terminal in a wireless network.

2. Description of the Related Art

Generally, wireless systems are classified into a mobile communication system to which a mobile phone or a Personal Cellular System (PCS) phone is applied, a Wireless Local Loop (WLL) system, and a Wireless Local Area Network (Wireless LAN) system. Such wireless systems have been developed as independent systems. Currently, however, the wireless systems are integrating an Internet Protocol (IP). In a method proposed to integrate systems using an IP, the systems communicate using Mobile IP. In systems where terminals communicate using Mobile IP, a target with which the terminal will communicate with over a wireless channel is referred to as an access router (AR). The Wireless LAN system is the most typical example of the system in which the access router is used.

A description will now be made of a Wireless LAN system using the Mobile IP. Basically, because a Wireless LAN system communicates with an access router using a wireless channel, the system can guarantee support for the mobility of the terminals as long as the system communicates through one access router. Such partial mobility guarantee cannot fully guarantee full mobility of terminals. That is, a terminal may move to a new access router while communicating in the coverage area of a current access router. In this case, like a mobile communication system, a Wireless LAN system must provide handover of a terminal in order to guarantee mobility. That is, the Wireless LAN system should also provide seamless communication during handover by managing the locations of terminals. In order to provide the seamless communication even during handover, the Mobile IP technology is used. The Mobile IP technology is classified into Mobile IPv4 and Mobile IPv6 according to which version is being used. In the following description, a terminal using Mobile IP will be referred to as a "mobile node (MN)" regardless of the version.

Mobile IPv4 defines a home agent (HA) and a foreign agent (FA) in order to provide for the mobility of a mobile node. In addition, Mobile IPv4 performs location management on the mobile node through the HA and the FA. The HA is located in a home network of the mobile node, and the FA is located in a target network to which the mobile node is handed over. The mobile node informs the HA of its current location each time it performs handover. Then the HA stores location information of the mobile node, and when there is data to be delivered to the mobile node, the HA encapsulates the corresponding data and delivers the encapsulated data to the FA through a tunnel. Then the FA receives the encapsulated data from the HA and delivers the received data to the mobile node located in its network.

As described above, the data delivered to a mobile node always passes through the HA, so that a data delivery route is not optimized. In order to solve this problem, a Route Optimization (RO) technique has been proposed. Meanwhile, Mobile IPv6 technology has been proposed to take best advantage of the IPv6 technology and to support a mobile node in an IPv6 network. In the IPv6 technology, because data is delivered to a mobile node basically using the Route Optimization technique, the mobile node becomes an end of a tunnel and decapsulates the encapsulated data.

A Mobile IP provides a handover method in Layer 3 (L3) in OSI 7 Layer. However, no discussion has been made on a handover method in Layer 2 (L2), communication in which should be completed before communication caused by a handover is performed in L3. In addition, a long time delay occurs during handover of a mobile node, thus making it difficult for the mobile node to perform a seamless communication. In order to solve this problem, Fast Mobile IP and Hierarchical Mobile IP have been proposed. Such techniques are superior to the simple Mobile IP in reducing a time delay occurring during handover. However, like the Mobile IP, these techniques also manage handover in L3. That is, L2 handover is not considered in these techniques. In other words, there has been proposed no appropriate method for optimizing the L2 handover and a mutual relation between L2 handover and L3 handover during L2 and L3 handovers based on the L2 handover optimization.

A description will now be made of a time delay occurring in an L2 handover process. A time delay occurring in the L3 handover process is caused by a characteristic of a wireless network as described below.

Neighbor wireless networks, although they use the same medium, use different channels in order to prevent interference. Therefore, to perform handover, a mobile node should acquire medium information and channel information used in a target wireless network to which it will be handed over. In order to acquire such information, the L2 of the mobile node should examine information on all media and channels available in the wireless network. A process of acquiring the information on all media and channels available in the wireless network is called "channel scanning." After performing the channel scanning process, the mobile node selects the best medium and channel for handover. After determining the best medium and channel, the mobile node selects an access router (AR) corresponding to the determined medium and channel, and then performs the L2 handover process.

FIG. 1 is a diagram illustrating the access routers communicating via an IP network and a route of a mobile node. In FIG. 1, an Internet network 131 is an IPv4 or IPv6 network. The Internet network 131 is connected to first and second routers 121 and 122. The first and second routers 121 and 122 are connected to a plurality of access routers 111, 112, 113 and 114. In FIG. 1, the first router 121 is connected to first and second access routers 111 and 112, and the second router 122 is connected to third and fourth access routers 113 and 114, by way of example.

It is assumed that the first access router 111 has an IEEE 802.11a network channel, the second access router 112 has an IEEE 802.11b network channel, the third access router 113 has an IEEE 802.11a/b network channel, and the fourth access router 114 has an IEEE 802.11g network channel. A mobile node 101 is first connected to the first access router 111, and communicates over a wireless channel. The mobile node 101 is represented by reference numeral 101a when it is located in the coverage area of the first access router 111. The mobile node 101 is represented by reference numeral 101b when it is located in the coverage area of the second access router 112. The mobile node 101 is represented by reference numeral 101c when it is located in the coverage area of the third access router 113.

In this way, the mobile node changes the access router with which it communicates, as it moves. When the mobile node stays in the coverage area of the particular access router, there is no problem caused by handover. However, when the mobile node moves to a new access router, the mobile node should perform a handover, raising a problem caused by the handover.

For example, in some cases, a mobile node may change network coverage while communicating with the first access router 111 in network coverage area of the first access router 111 where the mobile node is currently is located. That is, as shown by an arrow 10, the mobile mode 101a may move to network coverage area of the second access router 112. When the access router is changed from the first access router 111 to the second access router 112 due to the change in network coverage area of the mobile node, the first and second access routers 111 and 112 may use different communication standards. For example, if the first access router 111 uses an IEEE 802.11a standard and the second access router 112 uses an IEEE 802.11b standard, the following problem can arise because they use different access techniques.

At first, because the mobile node 101a cannot know the communication standard and a channel used in a neighbor network, the mobile node 101a should detect the communication standard and a channel used in the neighbor network. In order to detect the communication standard and channel in use, the mobile node scans all channels defined in the IEEE 802.11a standard used in the network to which it is currently connected. However, in the neighbor network using the IEEE 802.11b standard, the mobile node cannot acquire the information. Then the mobile node again scans the channels using its available access standard other than the IEEE 802.11a standard. If the mobile node can use all of the IEEE 802.11a, IEEE 802.11b and IEEE 802.11g standards, it selects one of the IEEE 802.11b and IEEE 802.11g standards and again scans channels of the neighbor network through the selected communication standard. If the IEEE 802.11b standard is selected, the mobile node can detect a channel used in the neighbor network. However, if the IEEE 802.11g standard is selected, the mobile node should scan all of the channels using the IEEE 802.11g standard and then, again scan a channel of the neighbor network using the IEEE 802.11b standard.

SUMMARY OF THE INVENTION

A time delay occurring when the mobile node scans channels of all of the neighbor networks based on all of the possible standards on a one by one basis has a bad influence upon communication, and not only Mobile IP but also Fast Handover and Hierarchical Mobile IP have the time delay problem. In addition, when the mobile node uses a portable power supply such as a battery, the long channel scanning time reduces the run time of the battery. Furthermore, the delay in performing handover may cause a reduction in quality-of-service (QoS).

It is, therefore, an object of the present invention to provide a system and method for reducing a time delay in performing a handover of a mobile node in a wireless network.

It is another object of the present invention to provide a system and method for reducing the power consumption during handover of a mobile node in a wireless network.

It is further another object of the present invention to provide a system and method for preventing a reduction in the QoS during a handover of a mobile node in a wireless network.

To achieve the above and other objects, provided is a system for providing handover of a mobile node in a wireless network supporting a Mobile IP. The mobile node sends, when handover is needed, a request for neighbor access router information to a first access router currently communicating with the mobile node, and selects, if the neighbor access router information is received, a second access router serving as a target access router using the received neighbor access router information. The first access router exchanges access router information with a neighbor access router, provides neighbor access router information to the mobile node upon receiving the neighbor access router information request from the mobile node, and redirects data to be delivered to the mobile node to the second access router to which the mobile node will be handed over. The second access router forwards data to be delivered to the mobile node, received from the first access router, to the corresponding mobile node.

To achieve the above and other objects, provided is a method for providing handover of a mobile node in a wireless network supporting a Mobile IP. The method includes the steps of exchanging access router information with a neighbor access router; if handover is needed, sending by the mobile node a request for neighbor access router information to a first access router currently communicating with the mobile node; providing, by the first access router, neighbor access router information to the mobile node upon receiving the neighbor access router information request from the mobile node; upon receiving the neighbor access router information, selecting by the mobile node a second access router to which the mobile node will be handed over according to the neighbor access router information; delivering a binding update message for empowering the first access router to bind a previous care-of-address (CoA) acquired from the first access router and a new CoA to be used in the second access router; and upon receiving the binding update message, redirecting by the first access router data to be delivered to the mobile node to the second access router so that the second access router forwards the data to the mobile node.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

To solve the problems described above, the present invention provides a method in which access routers, being geographically adjacent to each other, periodically exchange medium information and channel information used in their wireless network and provide the information to a mobile node. With the use of this method, the mobile node only needs to scan a predetermined medium and channel without the necessity of scanning all of the media and channels, thereby rapidly completing handover. That is, the present invention proposes a protocol capable of reducing a handover time, reducing power consumption, and preventing a reduction in the QoS. In the present invention, a protocol used to exchange information between access routers is a protocol in an application level.

Figure 1:
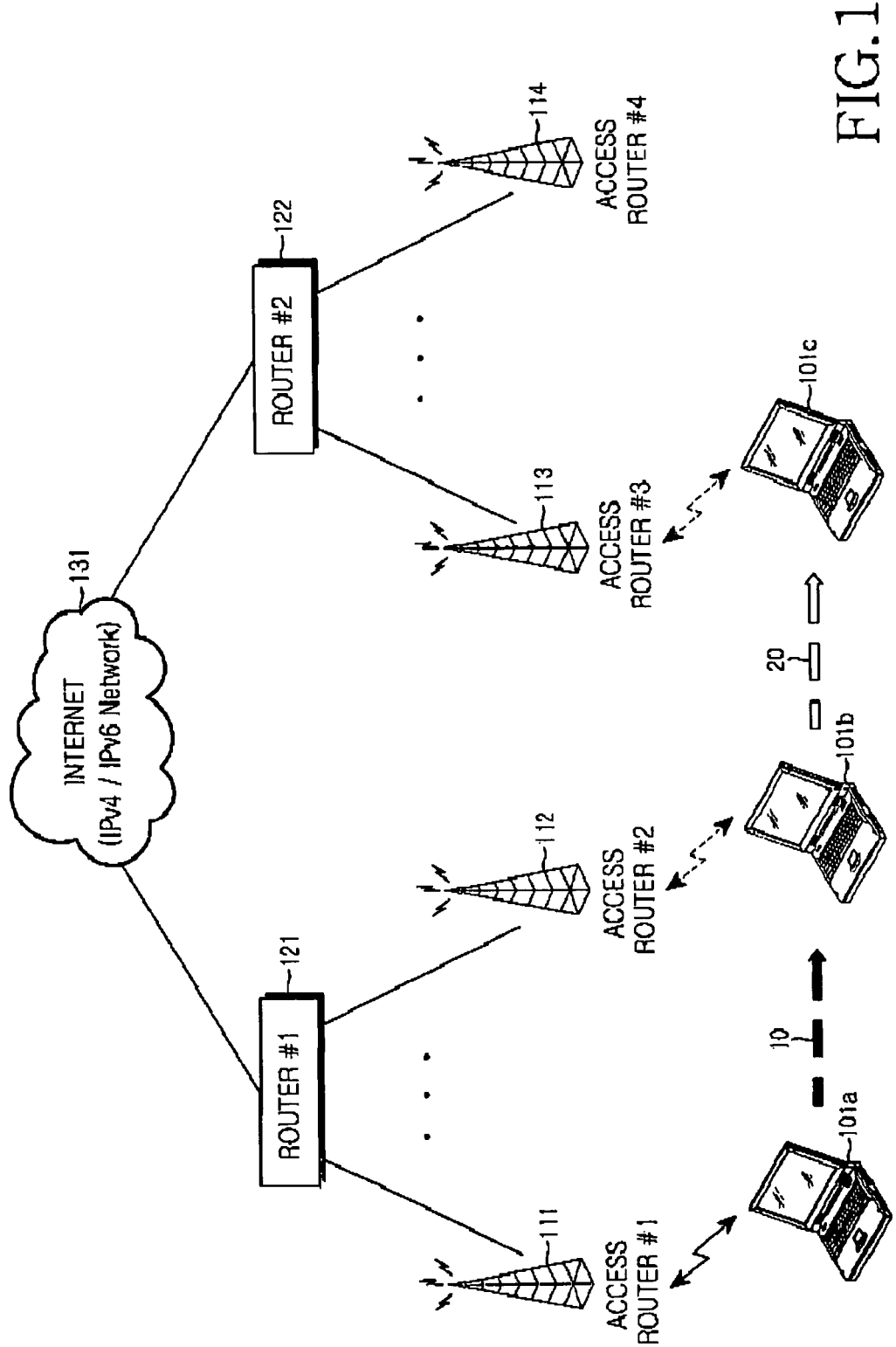
FIG. 1 is a diagram illustrating access routers communicating via an IP network and a route of a mobile node.
Figure 2:
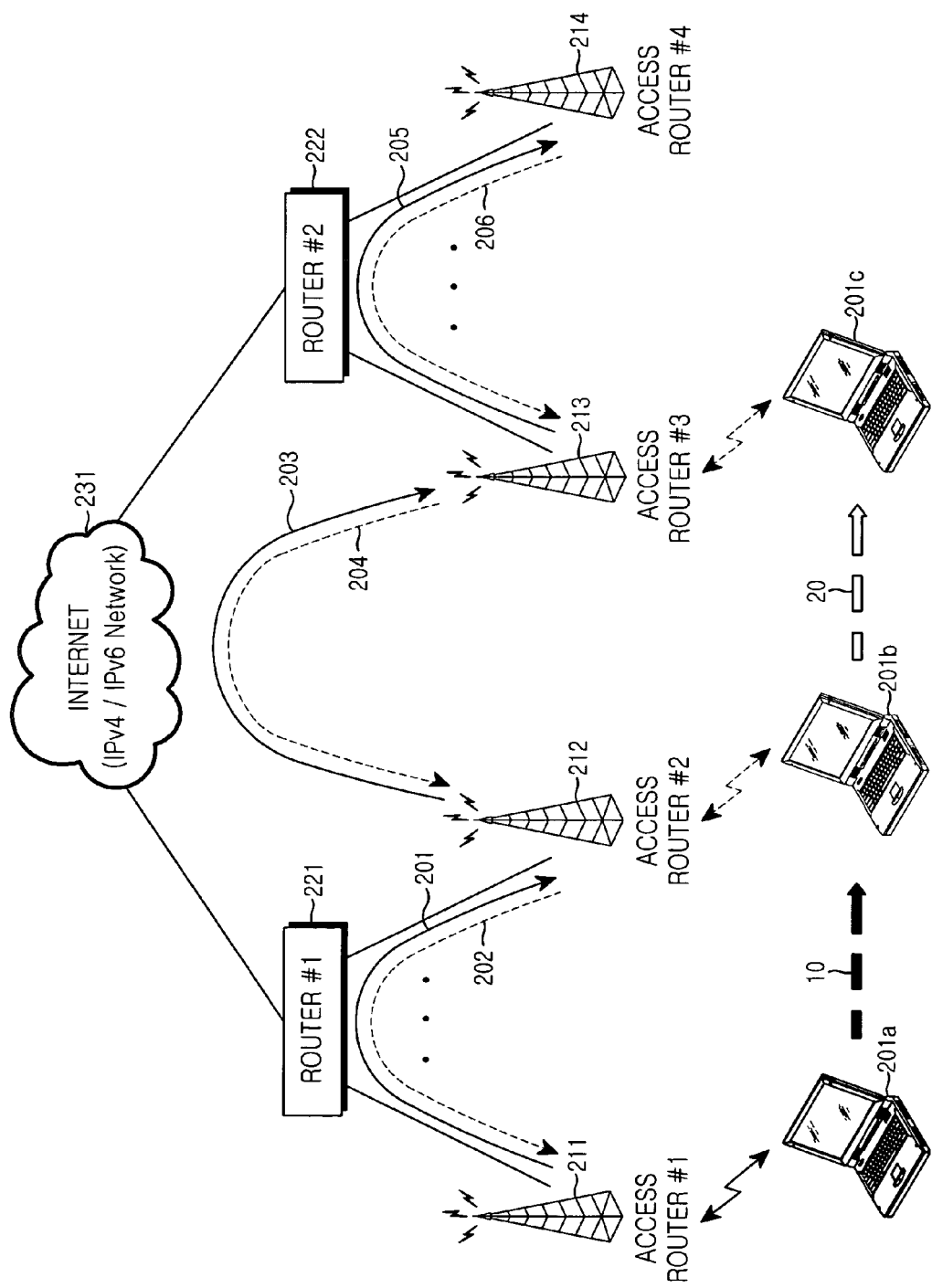
FIG. 2 is a diagram illustrating access routers using IP network and a route of a mobile node according to an embodiment of the present invention.

With reference to FIG. 2, a method for delivering information between access routers in a wireless network according to an embodiment of the present invention will be described. FIG. 2 is a diagram illustrating access routers using an IP network and a route of a mobile node according to an embodiment of the present invention. FIG. 2 is identical to FIG. 1 in structure.

Therefore, a first access router 211 has an IEEE 802.11a network channel, a second access router 212 has an IEEE 802.11b network channel, a third access router 213 has an IEEE 802.11a/b network channel, and a fourth access router 214 has an IEEE 802.11g network channel. A mobile node 201 is first connected to the first access router 211, and communicates through a wireless channel. The mobile node 201 is represented by reference numeral 201a when it is located in the coverage area of the first access router 211. The mobile node 201 is represented by reference numeral 201b when it is located in the coverage area of the second access router 212. The mobile node 201 is represented by reference numeral 201c when it is located in the coverage area of the third access router 213.

In this configuration, the first access router 211 delivers its standard and channel information to the second access router 212 via a first router 221 to which it is connected. This delivery route is represented by reference numeral 201. Also, the second access router 212 delivers its standard and channel information to the first access router 211 via the first router 221 to which it is connected. This delivery route is represented by reference numeral 202. The second access router 212 and the third access router 213 deliver data to an Internet network 231 via the first router 221 connected to the second access router 212. Thereafter, the second access router 212 delivers its standard and channel information to the third access router 213 through a second router 222 connected to the third access router 213. The delivery path is represented by reference numeral 203. Such standard and channel information can include standard information, channel information, QoS information, and security information. The terms "information," "standard information and channel information," and "standard and channel information" used herein are all used to represent the information stated above, and the standard and channel information can further include other information needed in a network and other information necessary for handover. Because the information necessary for handover in a network is well known in the art, a detailed description thereof will not be given herein.

In contrast, the third access router 213 and the second access router 212 deliver data to the Internet network 231 via the second router 222 connected to the third access router 213. Thereafter, the third access router 213 delivers its standard and channel information to the second access router 212 through the first router 221 connected to the second access router 212. This delivery route is represented by reference numeral 204. Also, the routes represented by reference numerals 205 and 206 are provided to deliver data in the same manner.

To perform the operation described above, each access router should be able to deliver its information to a neighbor access router which is geographically adjacent thereto. Further, each access router needs information related to its neighbor access router. A new method in which a particular access router determines information related to its neighbor access router is divided into the following two methods.

In a first method, a manager managing a network clearly defines access routers being adjacent to each access router. This is the simplest method and is available unless a network configuration is changed. However, in this method, the manager should personally define a neighbor access router for each access router. In addition, if an access router is added or changed, the manager should newly define the neighbor access routers.

In a second method, each access router can automatically acquire information related to its access router by means of a mobile node. In this method, as a mobile node provides information on a previous access router to an access router in the current network while performing a handover, the access router can acquire information related to its neighbor access router using the information. With the use of this method, each access router can automatically acquire information on access routers, even newly added access routers.

Figure 3:
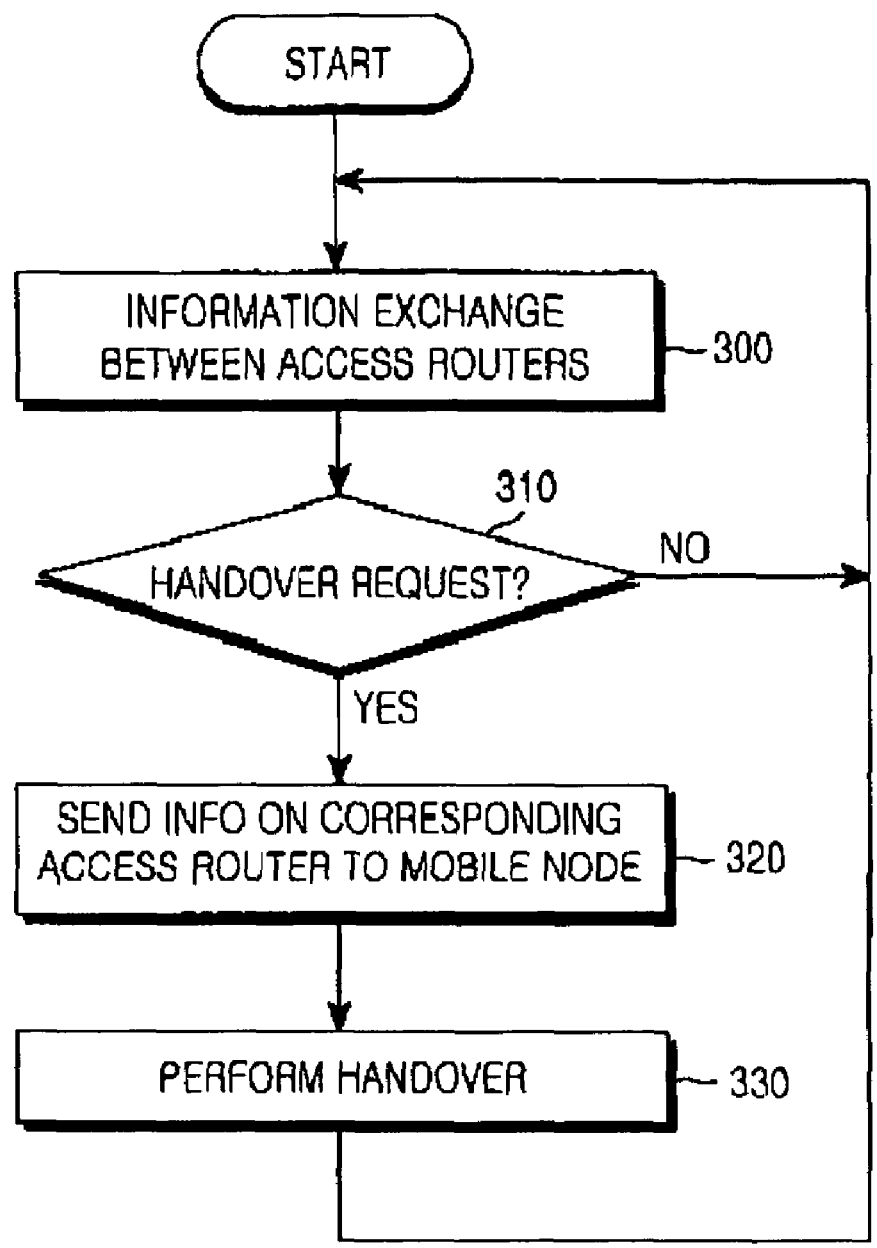
FIG. 3 is a flowchart illustrating an operation performed in each access router when a mobile node performs a handover according to an embodiment of the present invention.

FIG. 3 is a flowchart illustrating an operation performed in each access router when a mobile node performs a handover according to an embodiment of the present invention. With reference to FIG. 3, a description will be made of an overall process in which a mobile node is handed over from a particular access router to a new access router after information is exchanged between the access routers. In describing the process, it will be assumed that a mobile node 201a moves from a first access router 211 to a second access router 212.

Because the first access router 211 and the second access router 212 are adjacent to each other, it is presumed that standard and channel information has already been exchanged between the access routers. A detailed description of the information exchange between the access routers will be made with reference to FIG. 4. It will be assumed in step 300 of FIG. 3 that the information exchange between the access routers has already been performed. When the process is initially performed, the access routers can recognize that they are adjacent to each other after a handover request is received from a particular mobile node. In most cases, such an event generally happens after the information exchange is already performed. Therefore, it is assumed that the process of step 300 has already been performed. The first access router 211 and the second access router 212 already know information on IEEE standards and channels used therein.

As a particular mobile node 201a moves to the second access router 212 along an arrow 10, the mobile node 201a sends a handover request to the first access router 211. At this moment, the mobile node 201a sends the first access router 211 a request for information on a target access router to which it will be handed over. If the first access router 211 receives such a handover request, i.e., if it is determined in step 310 that a handover request is received from a particular mobile node, then the first access router 211 proceeds to step 320. In step 320, the first access router 211 delivers, to the mobile node 201a, standard and channel information used in the second access router 212, a target access router requested by the mobile node 201a. Thereafter, in step 330, the first access router 211 performs a process of releasing a channel established to the mobile node 201a and interrupting the communication. This process is performed even in the mobile node 201a, and the mobile node 201a releases the channel to the first access router 211 and sets up a channel to the second access router 212, thereby performing handover. In this way, the mobile node 201a becomes the mobile node 201b located in the second access router 212.

Figure 4:
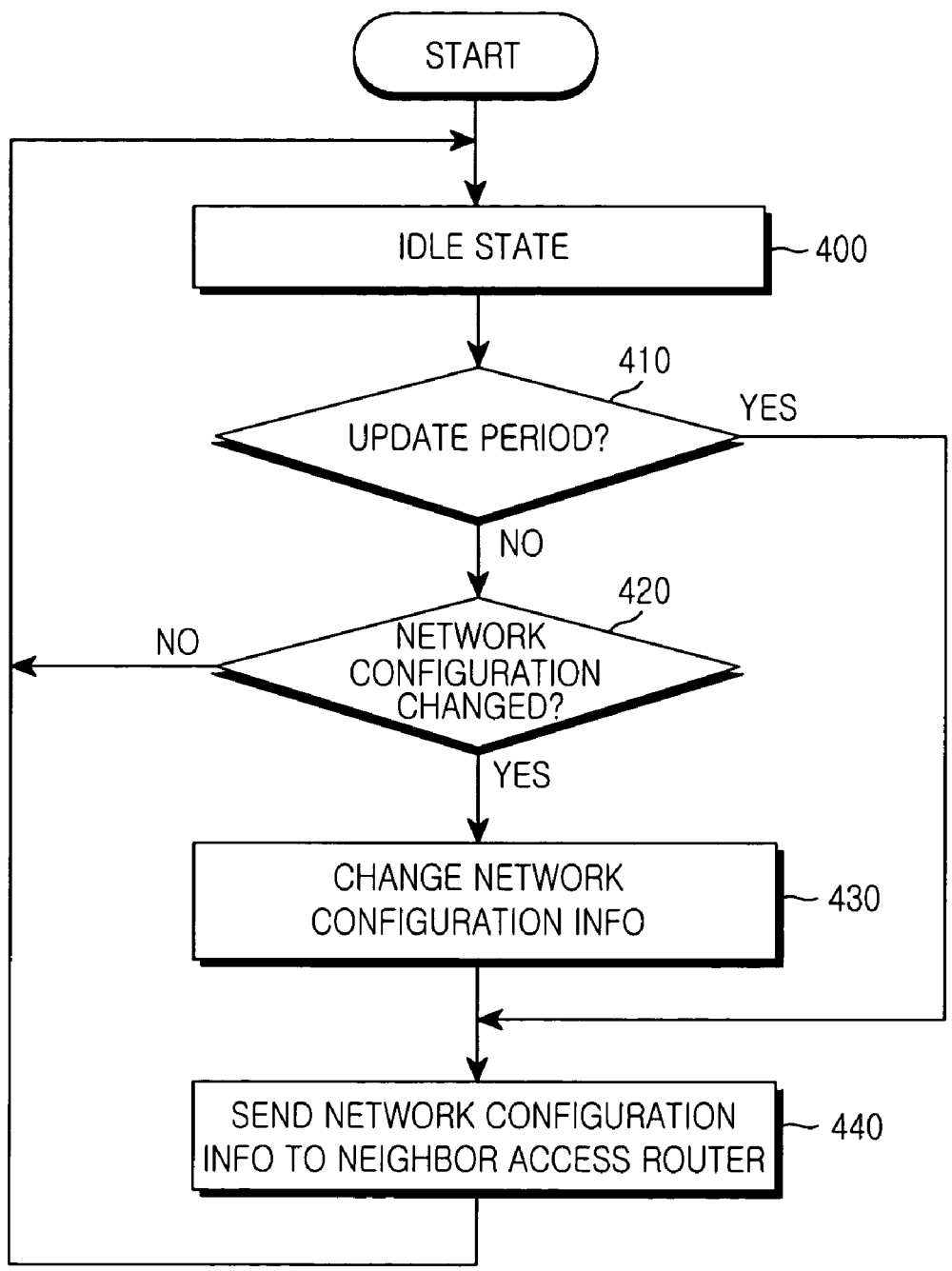
FIG. 4 is a flowchart illustrating a process of updating neighbor network information by an access router in a wireless network according to an embodiment of the present invention.

FIG. 4 is a flowchart illustrating a process of periodically updating neighbor network information, i.e., information related to a neighbor access router, by an access router in a wireless network according to an embodiment of the present invention. The term "network information" as used herein refers to information related to access routers. With reference to FIG. 4, a detailed description will be made of a process of updating neighbor network information by an access router in a wireless network according to an embodiment of the present invention. It will be assumed that the process of FIG. 4 is performed by the first access router 211 of FIG. 2.

In step 400, the first access router 211 holds an idle state. The idle state used in FIG. 4 refers to a state in which the first access router 211 performs no operation, or a state in which the first access router 211 does not perform an operation related to the present invention.

In the idle state, the first access router 211 determines in step 410 if an update period has arrived. It will be assumed herein that the first access router 211 has a predetermined update period in order to exchange its information with a neighbor access router. The update period can be set to, for example, 30 seconds. If the update period has arrived, the first access router 211 proceeds to step 440. However, if the update period has not arrived, the first access router 211 proceeds to step 420.

In step 420, the first access router 211 determines if its network configuration (or environment) is changed. The change in network configuration or environment corresponds to a change in channel or a change in standard in use. If it is determined that the network configuration is changed, the first access router 211 proceeds to step 430, and otherwise, the first access router 211 returns to step 400. In step 430, the first access router 211 updates and stores the changed network configuration information, and then proceeds to step 440. In step 440, the first access router 211 delivers the network configuration information to neighbor access routers. As stated above, the first access router 211 delivers network information to the second access router 212, or its neighbor access router. The first access router 211 can determine the neighbor access routers in the method described in connection with FIG. 3.

The method of exchanging information between access routers can be divided into a method of periodically exchanging the information and a method of providing the information to access routers in a neighbor network each time the network configuration is changed. Because the methods have advantages and disadvantages, they can be selected according to a network management policy.

Figure 5:
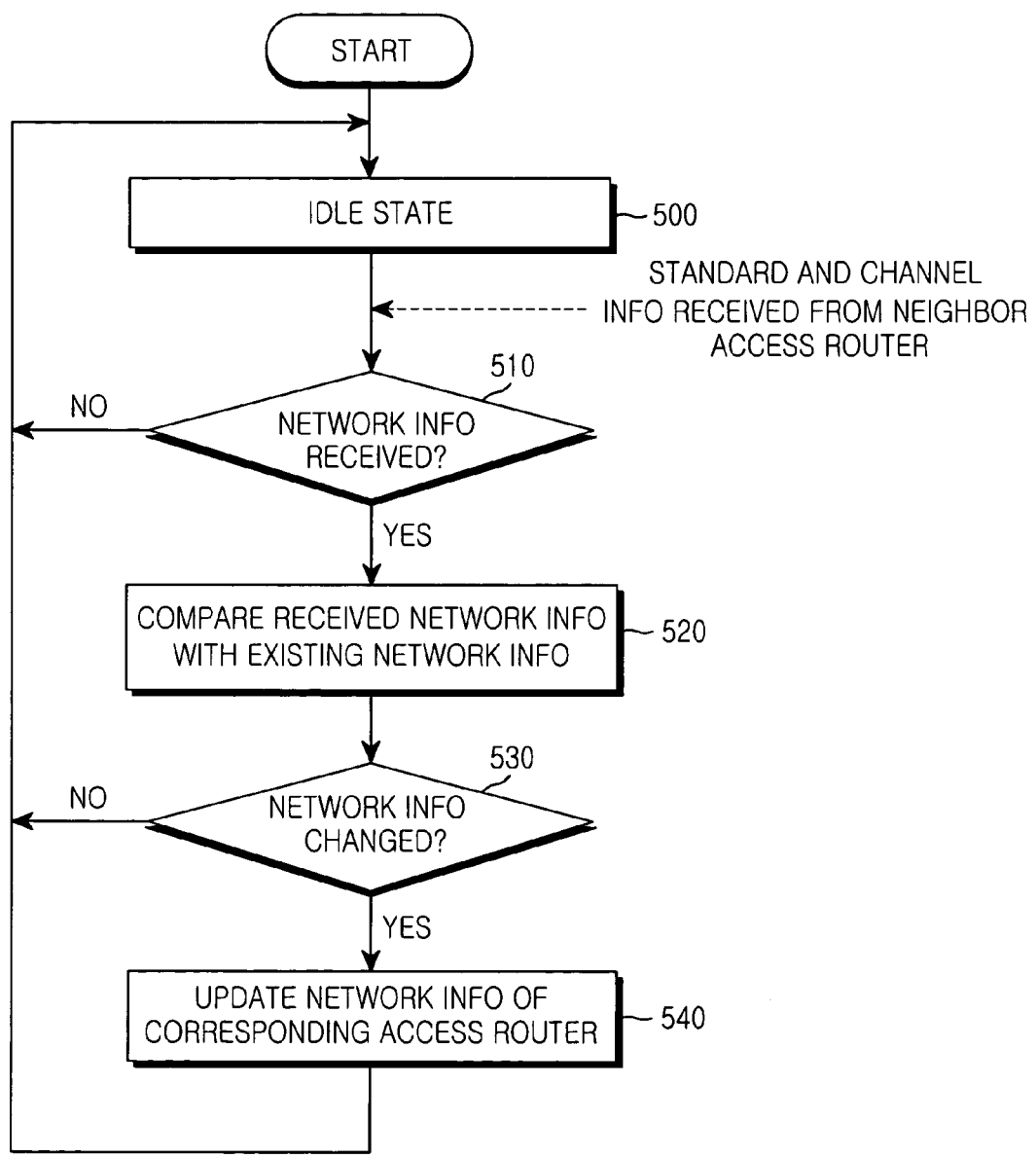
FIG. 5 is a flowchart illustrating a process of receiving network information from a neighbor access router by an access router according to an embodiment of the present invention.

FIG. 5 is a flowchart illustrating a process of receiving network information from a neighbor access router by an access router according to an embodiment of the present invention. With reference to FIG. 5, a detailed description will be made of a process of receiving network information from a neighbor access router by an access router according to an embodiment of the present invention. It will be assumed that the process of FIG. 5 is performed by the first access router 211 of FIG. 2.

In step 500, the first access router 211 holds an idle state. The idle state used in FIG. 5 refers to a state in which the first access router 211 performs no operation, or a state in which the first access router 21.1 does not perform an operation related to the present invention.

In the idle state, the first access router 211 determines in step 510 if information is received from a neighbor access router. If it is determined in step 510 that network information including standard and channel information is received from a neighbor access router, the first access router 211 proceeds to step 520 where it compares the received network information with existing network information of the corresponding neighbor access router, stored therein. Thereafter, in step 530, the first access router 211 determines if the network information received from the neighbor access router is different from the existing network information, i.e., if the network information is changed. If the received network information is changed, the first access router 211 proceeds to step 540, and otherwise, the first access router 211 returns to step 500. In step 540, the first access router 211 updates and stores the network information of the corresponding access router received from the neighbor access router. In this way, if the network information received from the neighbor access router is changed, the first access router 211 can continuously update and maintain neighbor network information.

Figure 6:
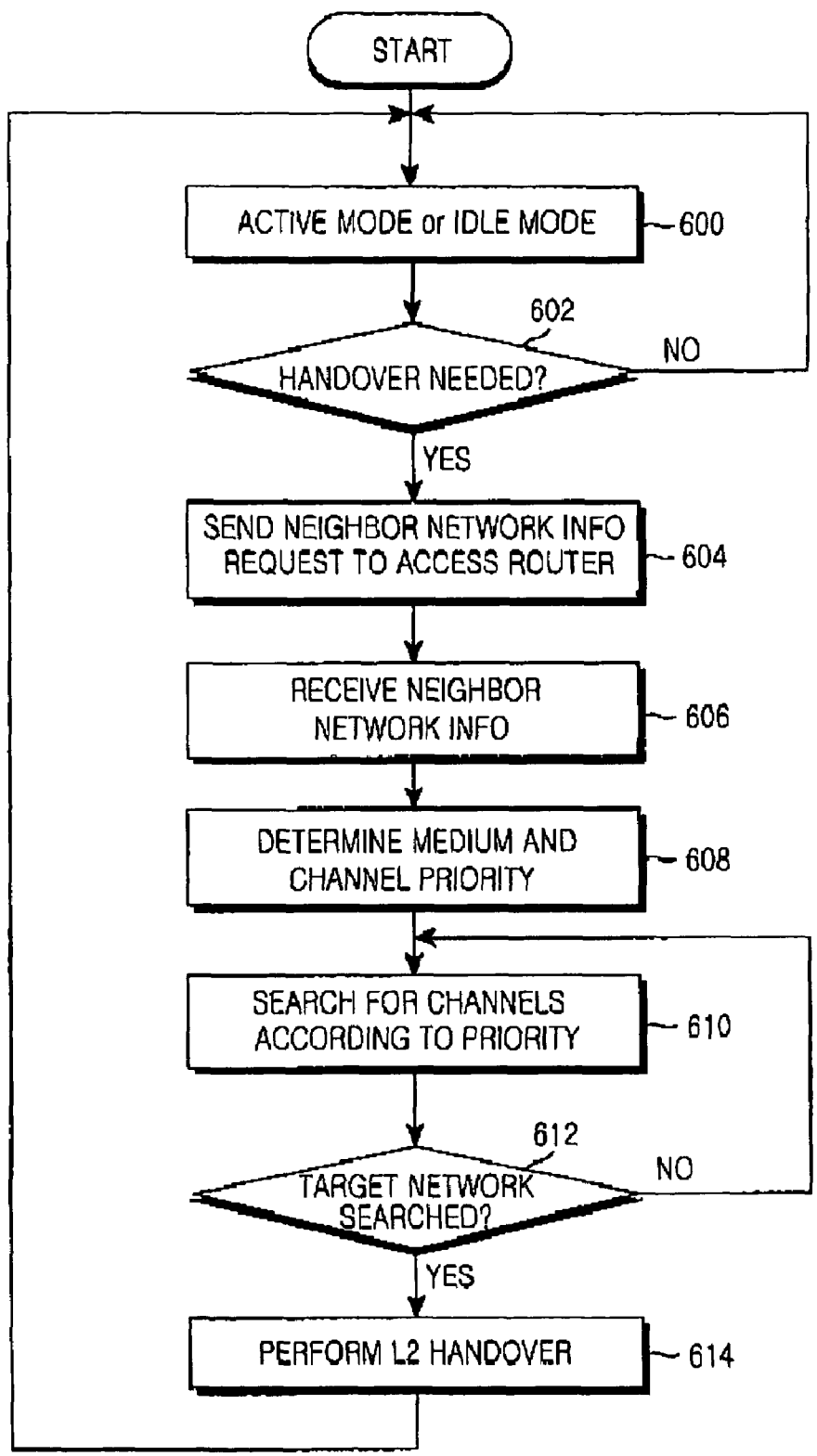
FIG. 6 is a flowchart illustrating a process of performing a handover by a mobile node in a network according to an embodiment of the present invention.

FIG. 6 is a flowchart illustrating a process of performing handover by a mobile node in a network according to an embodiment of the present invention. With reference to FIG. 6, a detailed description will be made of a process of performing handover by a mobile node in a network according to an embodiment of the present invention. In this process, it will be assumed that a mobile node 201a located in the coverage area of the first access router moves to the coverage area of the second access router 212 as illustrated in FIG. 2.

In step 600, the mobile node 201a performs an active mode or an idle mode. The "active mode" as used herein refers to a state in which the mobile node 201a is communicating with the first access router 211, or a current access router, and the "idle mode" as used herein refers to a state in which the mobile node 201a is not communicating with any access router. In this state, the mobile node 201a determines in step 602 if handover is needed. If it is determined in step 602 that handover is needed, the mobile node 201a proceeds to step

604. Whether handover is needed is determined by comparing a level of a signal received from the current access router with a level of a signal received from a new access router.

In step 604, the mobile node 201*a* sends a neighbor network information request to the first access router 211 with which it is communicating. In step 606, the mobile node 201*a* receives neighbor network information from the first access router 211 in response to the neighbor network information request. The received neighbor network information can be information related to a plurality of access routers rather than information related to a single access router. This can be understood from neighbor cells in a cellular system. After receiving the neighbor network information form the first access router 211, the mobile node 201*a* proceeds to step 608 where it determines the priority of medium and channel. In this case, the mobile node 201*a* first determines a particular medium and then, sets up a channel for the medium. It will be assumed that information on 3 neighbor access routers is received from the first access router 211, and the 3 neighbor access routers include two neighbor access routers having an IEEE 802.11a network environment and one neighbor access router having an IEEE 802.11g network environment. The mobile node 201*a* can acquire information related to channels used by the neighbor access routers, i.e., acquire channel information used by two neighbor access routers having an IEEE 802.11a network environment and channel information used by one neighbor access router having an IEEE 802.11g network environment. Therefore, with the use of a method of determining a particular standard and then scanning corresponding channels, it is possible to determine an access router capable of performing handover even without scanning all of the channels.

A detailed description of the method for determining the priority will not be given herein. After determining the priority, the mobile node 201*a* proceeds to step 610 where it scans channels according to the priority. Each time the mobile node 201*a* scans particular channels, the mobile node 201*a* determines in step 612 if it has searched for a target network to which it will be handed over. If it is determined in step 612 that the target network is searched, the mobile node 201*a* proceeds to step 614. However, if it is determined in step 612 that the target network is not searched, the mobile node 201*a* returns to step 610 where it changes channel and standard according to the next priority and performs a new scan according to the changed channel and standard.

After completing a search for a particular target network to which the mobile node 201*a* will be handed over, the mobile node 201*a* performs an L2 handover. Thereafter, the mobile node 201*a* performs a handover process on its high layer. After completing the handover process, i.e., after the mobile node 201*a* moves to a coverage area of the second access router 212 shown in FIG. 2, the mobile node 201*a* returns to step 600 where it performs an active mode or an idle mode.

The process of performing handover by a mobile node will be described again herein below with reference to FIG. 2. When the mobile node 201*a* moves from the first access router 211 to the second access router 212, the mobile node 201*a* determines that it is about to perform a handover, using a level of a signal received from the current network. Then the mobile node 201*a* sends a request for information related to a neighbor wireless network to the first access router 211 in the current network. Using this information, the mobile node 201*a* can acquire the following information. First, the mobile mode 201*a* can determine an administrative domain where it is located, and determine a hop distance between neighbor access routers. In addition, the mobile node 201*a* can acquire information indicating a function available in the access router. Using the information, the mobile node 201*a* can acquire information on a neighbor wireless network, and select the best access router for communication with the mobile node among the neighbor access routers to perform handover.

However, the current Mobile IP technology does not provide technology for allowing a mobile node to select the best access router. Therefore, the present invention proposes a method for performing efficient handover using an Access Router Information Protocol (ARIP) packet. The ARIP packet proposed in the present invention can be used even for handover between heterogeneous networks. A description will now be made of a method for performing handover using an ARIP packet.

In order to perform handover to a wireless network, the current mobile node should scan all of the channels for each wireless network as described above. In this way, the mobile node can select the best access router for communication with the mobile node, and after selecting the best access router, the mobile node starts L2 handover. When the ARIP packet according to the present invention is used, the mobile node can acquire information related to a neighbor wireless network. The mobile node is allowed to scan only the channel used in the neighbor network, thereby reducing a required handover time.

The ARIP packet has a format illustrated in Table 1.

TABLE 1

MAC Header (14 bytes)
IPv6 Header (20 bytes)
UDP Header (8 bytes)
ARIP Information (64 bytes + option length)

Table 2 illustrates information type and format of an ARIP information field located in the end of the ARIP packet.

TABLE 2

| Medium Info | Address of Access Router | | Flags |
|---|---|---|---|
| | Channel Info | QoS Info | |
| | Authentication Info | | |
| | Address Prefix | | |
| | Options | | |

Respective fields used in Table 2 have the following lengths. An 'Address of Access Router' field has 128 bits, a 'Medium Info' field has 32 bits, a 'Channel Info' field has 32 bits, a 'QoS Info' field has 32 bits, a 'Flags' field has 32 bits, an 'Authentication Info' field has 128 bits, an 'Address Prefix' field has 128 bits, and an 'Options' field has a variable size.

Information exchanged between access routers, included in the ARIP packet according to the present invention, is as follows. In order to reduce a time delay required for L2 handover of a mobile node, the ARIP packet delivers L2 information. For example, the ARIP packet includes different information according to a medium used in a wireless network, and when IEEE 802.11 is used, the ARIP packet includes Extended Service Set ID (ESSID) and channel information. In Table 2, the 'Address of Access Router' field represents an address of an access router, and the 'Medium info' and 'Channel Info' fields represent a wireless access medium to be used and a channel to be used, respectively. The 'Flags' field represents information indicating if the current access router transmitting the corresponding packet supports Fast Handover and Paging. The 'QoS info' and 'Authentication Info' fields represent QoS information provided in the corresponding access router and information on authentication in use, respectively. The 'Address Prefix' field represents a prefix of an address used in a network managed by the current access router. Finally, when additional information is needed, the information is delivered using the 'Options' field.

For example, when 802.11 Wireless LAN is used, information such as ESSID is delivered. Also, L3 information can be included in order to reduce a time delay required for L3 handover. In addition, application information for supporting handover of a mobile node can also be included.

Figure 7:
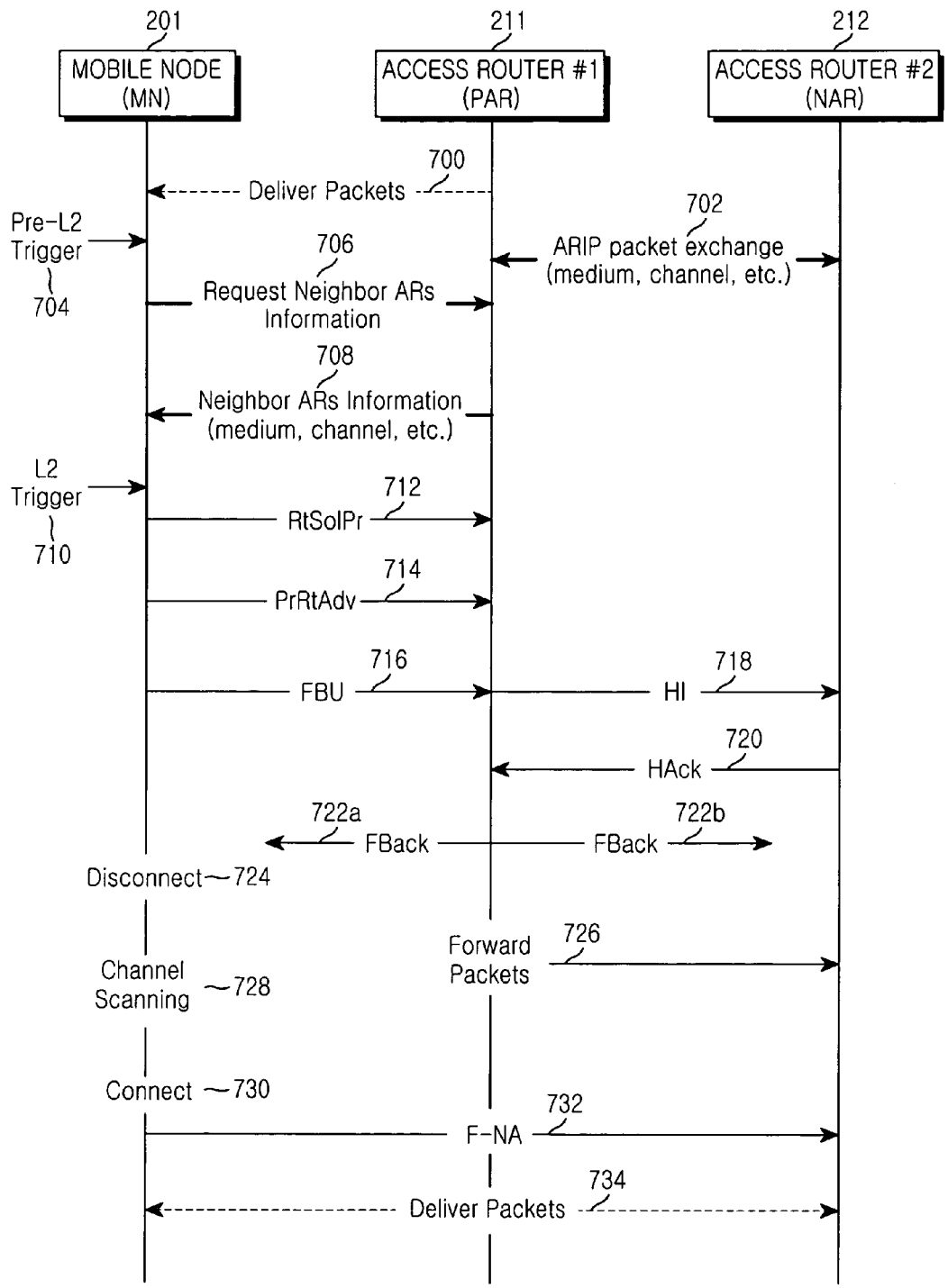
FIG. 7 is a signaling diagram illustrating a process of performing Predictive Fast Handover by a mobile node using an ARIP packet according to an embodiment of the present invention.

FIG. 7 is a signaling diagram illustrating a process of performing Predictive Fast Handover by a mobile node using an ARIP packet according to an embodiment of the present invention. With reference to FIG. 7, a detailed description will be made of signaling flow and operation between a mobile node and access routers when Predictive Fast Handover is performed using an ARIP packet according to an embodiment of the present invention.

In FIG. 7, a mobile node (MN) 201 corresponds to the mobile node 201 illustrated in FIG. 2, a first access router 211 serves as a previous access router (PAR), and a second access router 212 serves as a new access router (NAR) which becomes a handover target.

In step 700, the mobile node 201 is receiving data from the first access router 211. A description will be made of handover performed while the mobile node 201 is receiving data in this way. In step 702, network information is exchanged between the first access router 211 and the second access router 212, or a neighbor access router, using an ARIP packet according to an embodiment of the present invention.

In this state, there is a case where a pre-L2 trigger occurs while the mobile node 201 is communicating with the first access router 211. The L2 trigger occurs to request L2 handover. That is, the L2 trigger occurs to inform an upper layer of a mobile node that the mobile node should perform communication with a new access router because a level of a signal from the first access router 211 is low. In step 706, the mobile node 201 sends a neighbor network information request to the first access router 211 by transmitting an ARIP packet according to an embodiment of the present invention in order to acquire neighbor network information. The pre-L2 trigger can occur at any time between a time at which the mobile node 201 enters coverage of a particular network and a time at which the L2 trigger (in which handover indication is delivered from L2 to L3) occurs for an actual handover, and this is determined according to a network management policy.

Upon receiving the neighbor network information request, the first access router 211 delivers, in step 708, information related to the first access router 211 and its neighbor access routers to the mobile node 201. Then the mobile node 201 generates the L2 trigger in step 710, and then proceeds to step 712 where it sends the first access router 211 a Router Solicitation-for-Proxy (RtSolPr) message for requesting information for a Fast Handover. In step 714, the first access router 211 delivers its access router information to the mobile node 201 using a Proxy Router Advertisement (PrRtAdv) message.

Then the mobile node 201 generates a prospective new care-of-address (NCoA). In step 716, the mobile node 201 delivers a Fast Binding Update (FBU) message including the generated prospective NCoA to the first access router 211. The FBU message is a message used by the mobile node 201 to inform the first access router 211 that it should redirect traffic to the second access router 212. Therefore, the FBU message empowers the first access router 211 to bind a previous CoA (PCoA), or a CoA available in the first access router 211 which is a previous access router, and a CoA available in the second access router 212 which is a new access router. This is to tunnel a packet to be delivered to the mobile node 201 via the first access router 211, to the second access router 212 according to a change in location of the mobile node 201.

In step 718, the first access router 211 receiving the FBU message from the mobile node 201 delivers a Handover Initiation (HI) message to the second access router 212 which a new access router. The HI message is delivered from the first access router 211 to the second access router 212, or a new access router, to initiate handover. In step 720, the second access router 212 delivers a Handover Acknowledgement (HACK) message to the first access router 211, or the previous access router, in response to the HI message received from the first access router 211. A process of exchanging the HI message and the HACK message is performed to verify if a prospective NCoA is available.

In steps 722a and 722b, the first access router 211 receiving the HACK message delivers a Fast Binding Acknowledgement (FBACK) message to the mobile node 201 and the second access router 212. From this time on, the mobile node 201 should use an NCoA available when it accesses the second access router 212, or the new access router, the NCoA being carried by the HI message and verified by the new access router or the NCoA being assigned by the new 5 access router. Thus, in step 724, the mobile node 201 disconnects a channel connected to the first access router 211.

In step 726, the first access router 211 forwards data to be delivered to the mobile node to the second access router 212, or the new access router. In step 728, the mobile node 201 determines priority and scans a channel according to received neighbor network information described in connection with FIG. 6. The mobile node 201 scans only a limited number of channels using information in the ARIP packet according to the present invention in searching for a neighbor network to perform handover. After the channel scanning, the mobile node 201 prepares for connection in step 730.

In step 732, the mobile node 201 delivers a Fast Neighbor Advertisement (FNA) message to the second access router 212, or the new access router. The FNA message, a message delivered from a mobile node to a second access router, is used to inform that upon receiving the FBACK message, the mobile node 201 has determined the NCoA and accessed a new access 20 router. In step 734, the second access router 212 receiving the FNA message forwards data received from the first access router 211 to the mobile node 201.

Figure 8:
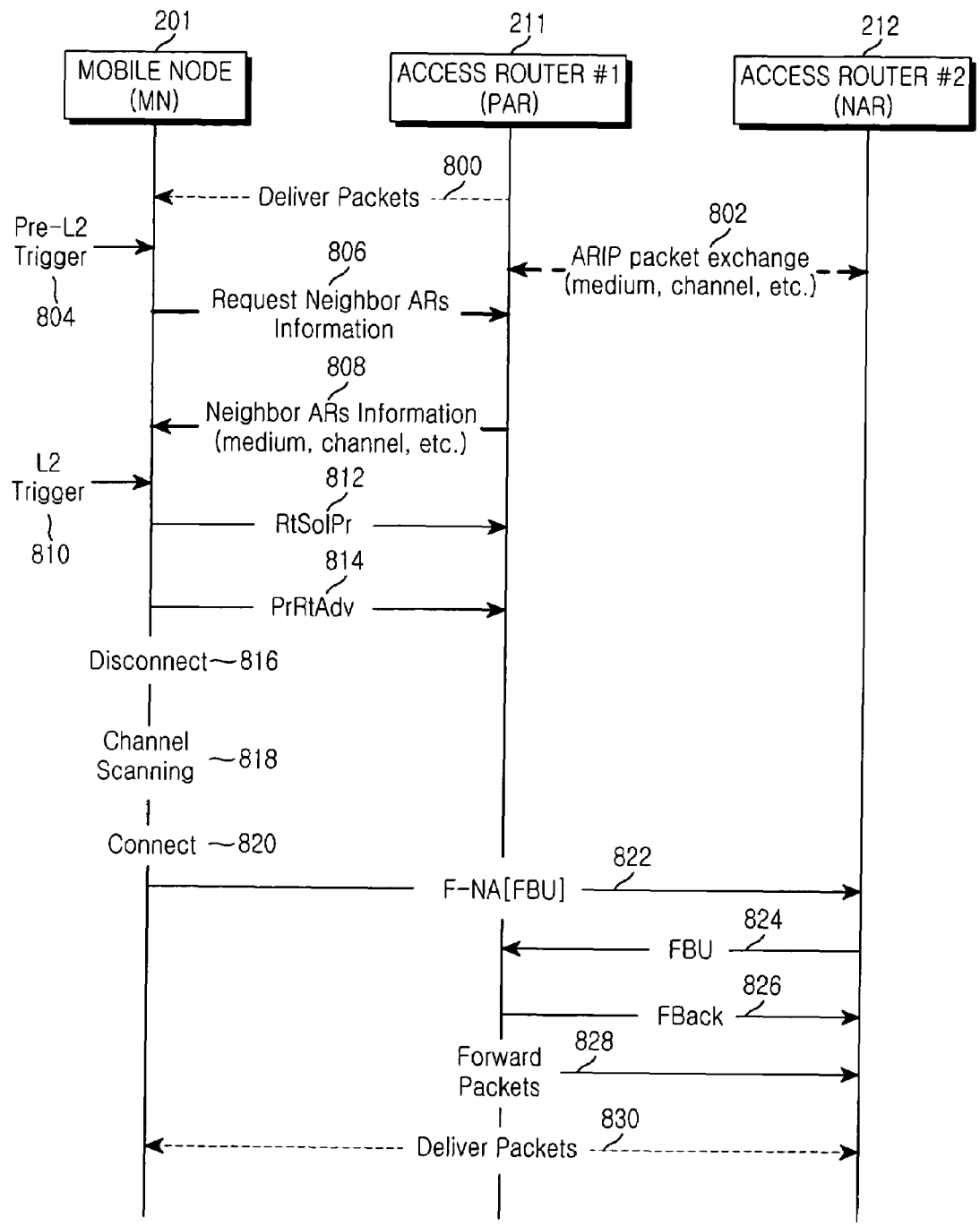
FIG. 8 is a signaling diagram illustrating a process of performing Reactive Fast Handover by a mobile node using an ARIP packet according to an embodiment of the present invention.

FIG. 8 is a signaling diagram illustrating a process of performing Reactive Fast Handover by a mobile node using an ARIP packet according to an embodiment of the present 25 invention. With reference to FIG. 8, a detailed description will be made of signaling flow and operation between a mobile node and access routers when Reactive Fast Handover is performed using an ARIP packet according to an embodiment of the present invention.

In FIG. 8, a mobile node (MN) 201 corresponds to the mobile node 201 illustrated in FIG. 2, a first access router 211 serves as a previous access router (PAR), and a second access router 212 serves as a new access router (NAR) which becomes a handover target.

In step 800, the mobile node 201 is receiving data from the first access router 211. A description will be made of handover performed while the mobile node 201 is receiving data in this way. In step 802, network information is exchanged between the first access router 211 and the second access router 212, or a neighbor access router, using an ARIP packet according to an embodiment of the present invention.

In this state, there is a case where pre-L2 trigger occurs while the mobile node 201 is communicating with the first access router 211. The L2 trigger occurs to request L2 handover. That is, the L2 trigger occurs to inform an upper Layer 3 of a mobile node by Layer 2 that the mobile node should communicate with a new access router because a level of a signal from the first access router 211 is low. In step 806, the mobile node 201 sends a neighbor network information request to the first access router 211 by transmitting an ARIP packet according to an embodiment of the present invention in order to acquire neighbor network information. The pre-L 2 trigger can occur at any time between a time at which the mobile node 201 enters coverage of a particular network and a time at which L2 trigger (in which handover indication is delivered from L2 to L3) occurs for actual handover, and this is determined according to a network management policy.

Upon receiving the neighbor network information request from the mobile node 201, the first access router 211 delivers, in step 808, information related to the first access router 211 and its neighbor access routers to the mobile node 201. Then the mobile node 201 generates an L2 trigger in step 810, and then proceeds to step 812 where it sends the first access router 211 a Router Solicitation-for-Proxy (RtSolPr) message for requesting information for Fast Handover. In step 814, the first access router 211 delivers its access router information to the mobile node 201 using a Proxy Router Advertisement (PrRtAdv) message.

Thereafter, in step 816, the mobile node 201 disconnects a channel connected to the first access router 211. In step 818, the mobile node 201 scans only a limited number of channels using information in an ARIP packet to search for a neighbor network to perform handover. If the mobile node 201 fails to receive a FBACK message from the first access router 211, or a previous access router, for example, if the mobile node 201 did not send an FBU message or it leaves the first access router 211 before it received a FBACK message after sending an FBU message, then the mobile node 201 proceeds to step 822 where it encapsulates an FBU message and delivers the FBU message to the second access router 212, or the new access router, using a Fast Neighbor Advertisement (FNA) message. In the process of step 822, the second access router 212 verifies if an NCoA is available. If NCoA is in use, the second access router 212 discards an FBU message included in the FNA message, sets up a Neighbor Advertisement Acknowledgement (NAACK) option, and sends the NCoA using a Router Advertisement message. The FNA message, a message delivered from the mobile node 201 to the second access router 212, is used to inform that the mobile node 201 has determined a new NCoA and accessed the second access router 212.

Thereafter, the mobile node 201 accesses the second access router 212 and delivers an FBU message to the first access router 211. The FBU message The FBU message is a message used by the mobile node 201 to inform the first access router 211 that it should redirect data to be delivered to the mobile node 201 to the second access router 212. Therefore, the FBU message empowers the first access router 211 to bind a previous CoA (PCOA) of the first access router 211, or the previous access router, and a new CoA (NCoA) available in the second access router 212, the new access router, so that a packet is tunneled to a location where the mobile node 201 is located.

Then the first access router 211 delivers an FBACK message to the second access router 212 in response to the FBU message. Accordingly, the first access router 211 forwards data to be delivered to the mobile node 201 to the second access router 212. Thereafter, the second access router 212 delivers data received from the first access router 211 to the mobile node 201.

So far, with reference to FIGS. 7 and 8, a description has been made of a method for performing Fast Handover using an ARIP packet. By exchanging network information between access routers through an ARIP packet according to an embodiment of the present invention, each access router previously stores neighbor network information therein, thereby reducing a handover time as compared with when only general Fast Handover is used. That is, for channel scanning in L2, it is allowed to scan not all channels but only a limited number of channels, thereby making it possible to reduce a required time. The mobile node 201 scans networks in turn to perform handover. In this case, the mobile node 201 can define priority according to a state of the mobile node 201, using the above information. That is, for channel scanning, to the mobile node 201 does not scan all of the channels but only a limited number of channels, thereby enabling Fast Handover. In addition, the mobile node 201 can perform handover to its desired network.

That the mobile node can perform handover to its desired network becomes a factor capable of increasing overall network performance. For example, if a mobile node and a current access router both support Fast Handover, it is preferable for the mobile node to perform handover to a network supporting Fast Handover. Such particulars can be acquired using information included in an ARIP packet. For the same reasons, the QoS information can also be used by the mobile node.

Figure 9:
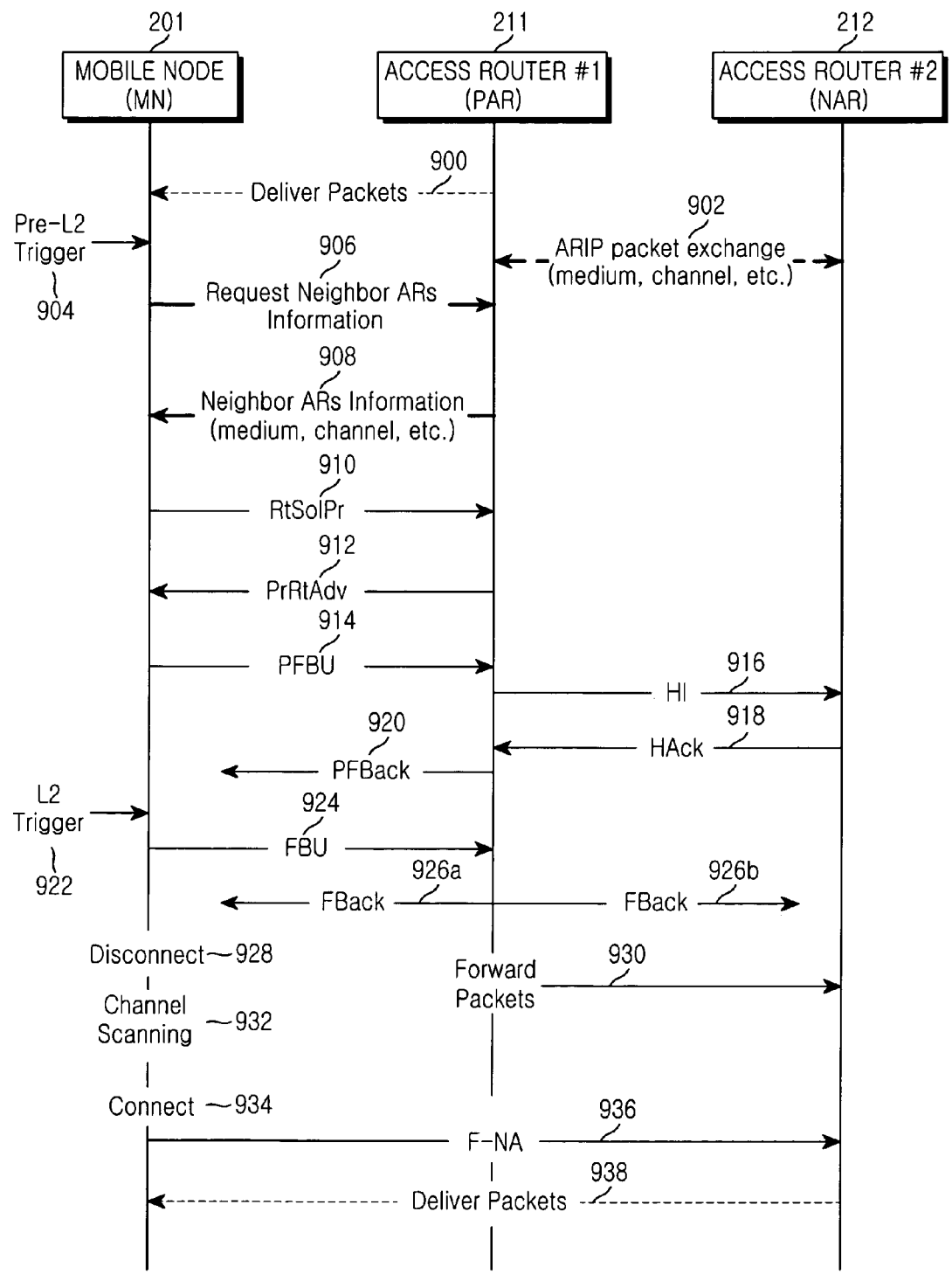
FIG. 9 is a signaling diagram illustrating a process of performing Fast Handover by a mobile node using an ARIP packet according to another embodiment of the present invention.

FIG. 9 is a signaling diagram illustrating a process of performing Fast Handover by a mobile node using an ARIP packet according to another embodiment of the present invention. With reference to FIG. 9, a detailed description will be made of signaling flow and operation between a mobile node and access routers when Fast Handover is performed using an ARIP packet according to another embodiment of the present invention.

In FIG. 9, a mobile node (MN) 201 corresponds to the mobile node 201 illustrated in FIG. 2, a first access router 211 serves as a previous access router (PAR), and a second access router 212 serves as a new access router (NAR) which becomes a handover target.

In step 900, the mobile node 201 is receiving data from the first access router 211. A description will be made of handover performed while the mobile node 201 is receiving data in this way. In step 902, network information is exchanged between the first access router 211 and the second access router 212, or a neighbor access router, using an ARIP packet according to an embodiment of the present invention.

In this state, there is a case where a pre-L2 trigger occurs in step 904 while the mobile node 201 is communicating with the first access router 211. The pre-L2 trigger can occur at any time between a time at which the mobile node 201 enters the coverage area of a particular network and a time at which the L2 trigger (in which handover indication is delivered from L2 to L3) occurs for the actual handover. The time at which the pre-L2 trigger happens is determined according to a network management policy. Thereafter, in step 906, the mobile node 201 sends a neighbor network information request to the first access router 211 by transmitting an ARIP packet according to an embodiment of the present invention in order to acquire the neighbor network information.

Upon receiving the neighbor network information request, the first access router 211 delivers, in step 908, information related to the first access router 211 and its neighbor access routers to the mobile node 201. Then the mobile node 201 determines the priority of the wireless media and channels to be used during handover according to its preference based on the received neighbor access router information. A detailed description of a method for determining priority according to preference will now be made herein. After determining the priority, the mobile node 201 proceeds to step 910 where it sends the first access router 211 an RtSolPr message for requesting information for handover.

In step 912, the first access router 211 delivers information related to neighbor access routers to the mobile node 201 using a Proxy Router Advertisement (PrRtAdv) message, and the mobile node 201 receives the Proxy Router Advertisement message. The mobile node 201 generates a prospective new CoA to be used in the selected neighbor access router. In step 914, the mobile node 201 generates a Prepare Fast Binding Update (PFBU) message including the generated prospective NCoA and delivers the PFBU message to the first access router 211. The PFBU message is a message used by the mobile node 201 to inform the first access router 211 that it should redirect data to be delivered to the mobile node 201 to the second access router 212.

The PFBU message empowers the first access router 211 to bind a previous CoA (PCoA), or a CoA available in the first access router 211 which is a previous access router, and a CoA available in the second access router 212 which is a new access router. This is to tunnel a packet to be delivered to the mobile node 201, to a new location of the mobile node 201.

The previous access router 211 receiving the PFBU for an access router from the mobile node 201 sends a Handover Initiation (HI) message to the second access router 212, or a new access router. In the embodiment of the present invention, the first access router 211 receiving the PFBU message delivers, in step 916, an HI message to the second access router 212, or the new access router. The HI message is delivered from the first access router 211 to the second access router 212, or the new access router, to initiate handover.

In response to the HI message received from the first access router 211, the second access router 212 performs, in step 918, Duplicate Address Detection (DAD) and delivers a Handover Acknowledgement (HACK) message to the first access router 211, or the previous access router, as a result of the DAD. A process of exchanging the HI message and the HACK message is performed to verify if a prospective NCoA is available. The first access router 211 receiving the HACK message from the second access router 212 generates a binding entry in a freeze state for PCoA (CoA used in PAR) and NCoA (CoA used in NAR) of the mobile node 201. The binding entry in a freeze state is not released until a Fast Binding Update (FBU) message is received from the mobile node 201, and for the binding entry in a freeze state, the first access router 211, or the previous access router, does not forward traffic to the second access router 212.

Upon receiving the HACK message, the first access router 211 delivers, in step 920, a Prepare Fast Binding Acknowledgement (PFBACK) message to the mobile node 201. The mobile node 201 selects the second access router 212 successfully transmitting the HACK message as a target of channel scanning during the L2 trigger, using a mapping ratio (L2:L3) of the L2 and L3 information. More specifically, in the embodiment of the present invention, if the first access router 211, or the previous access router, receives an HACK message from the second access router 212, it generates a Prepare Fast Binding Acknowledgement (PFBACK) message and delivers the PFBACK to the mobile node 201.

Upon receiving the PFBACK message, the mobile node 201 generates the L2 trigger in step 922. In addition, the mobile node 201 scans a channel used by the access router selected in step 920, and selects the second access router 212 which is a target access router. Thereafter, in step 924, the mobile node 201 delivers a Fast Binding Update (FBU) message to the first access router 211.

Thereafter, in steps 926a and 926b, the first access router 211 receiving the FBU message delivers a Fast Binding Acknowledgement (FBACK) message to the mobile node 201 and the second access router 212. Further, the first access router 211 releases a binding entry in a freeze state, and the other binding entries in a freeze state can be automatically eliminated by a timeout. From this time on, the mobile node 201 should use an NCoA available when it accesses the second access router 212, or the new access router, the NCoA being carried by the HI message and verified by the new access router or the NCoA being assigned by the new access router.

In step 928, the mobile node 201 disconnects a channel connected to the first access router 211. In step 930, the first access router 211 forwards data to be delivered to the mobile node to the second access router 212, or the new access router. In step 932, the mobile node 201 scans only a limited number of channels using information in the ARIP packet according to the present invention in searching for a neighbor network to perform the handover. After the channel scanning, the mobile node 201 prepares for connection in step 934.

In step 936, the mobile node 201 delivers a Fast Neighbor Advertisement (FNA) message to the second access router 212, or the new access router. The FNA message, a message delivered from the mobile node 201 to the second access router 212, is used to inform that upon receiving the FBACK message, the mobile node 201 has determined NCoA and accessed a new access router. In step 938, the second access router 212 receiving the FNA message forwards data received from the first access router 211 to the mobile node 201.

When handover is performed using an ARIP packet in the method described in connection with FIG. 9, the following advantages are provided. First, reverse address transition (a process of mapping an L2 identifier to an L3 identifier) can be omitted. Second, with the use of this method, a Duplicate Address Detection (DAD) process can be implemented as described in step 918. Finally, because channel scanning is performing on only selected access routers and reverse address transition-passed access routers among them, a cannel scanning time can be reduced. Such a method can be optionally used by comparing the overhead of a previously performing DAD in a candidate access router to which a mobile node will be handed over. That is, one of the method for interworking ARIP to Fast Handover as described in connection with FIG. 7 and the method for previously performing DAD as described in connection with FIG. 9 can be selected according to the importance of traffic. In the case where ARIP interworks with Fast Handover, Predictive Fast Handover chiefly occurs, and Reactive Fast Handover rarely occurs.

As described above, the present invention provides a method for exchanging information between neighbor access routers using an ARIP packet and delivering the information to a mobile node when the mobile node performs handover between wireless networks. With the use of this method, in performing L2 handover, the mobile node is allowed to scan only a limited number of channels using the information delivered from the access router without the necessity of scanning all of the channels. Therefore, a time delay required for L2 handover can be reduced. In this way, the present invention allows the mobile node to perform a fast handover, thereby improving network performance. Generally, in order to perform handover, a mobile node should scan all of the channels for each wireless network. However, according to the present invention, the mobile node scans only a limited number of channels according to neighbor access router information received from an access router, instead of scanning all of the channels. The ARIP packet according to the present invention can also be used for handover between heterogeneous networks. With the use of the ARIP packet, the mobile node can acquire information on a neighbor wireless network, so that it can scan only the channel used in the neighbor network, thereby reducing a handover time. For channel scanning in L2, the mobile node scans only a limited number of channels instead of scanning all channels, thus contributing to a reduction in handover time. By doing so, it is possible to rapidly perform handover with no regard to if the ARIP packet is used for Fast Handover. In addition, because the current Mobile IP technology does not provide technology capable of allowing a mobile node to select the best access router, the use of the ARIP packet proposed in the present invention can provide efficient handover.

As can be understood from the foregoing description, the present invention can increase handover speed of a mobile node. In addition, the present invention can perform fast handover even between heterogeneous networks. Moreover, a mobile node capable of supporting fast handover can select an access router supporting fast handover, thereby increasing network efficiency.

While the invention has been shown and described with reference to a certain preferred embodiment thereof it will be understood by those skilled in the art that various changes in form and details may be made therein without departing from the spirit and scope of the invention as defined by the appended claims.

What is claimed is:

1. A system for providing handover of a mobile node in a wireless network supporting a Mobile IP (Internet Protocol), comprising:
   a mobile node for sending a request for neighbor access router information to a first access router currently communicating with the mobile node, and selecting, if the neighbor access router information is received, a second access router serving as a target access router using the received neighbor access router information,
   wherein the first access router exchanges access router information with a neighbor access router, provides neighbor access router information to the mobile node upon receiving the neighbor access router information request from the mobile node, and redirects data to be delivered to the mobile node to the second access router to which the mobile node will be handed over, and the second access router forwards data to be delivered to the mobile node, received from the first access router, to the corresponding mobile node;
   wherein the first access router delivers the neighbor access router information to the mobile node upon receiving the neighbor access router information request from the mobile node, and redirects data to be delivered to the mobile node to the second access router to which the mobile node will be handed over, if a fast binding update message is received from the mobile node; and
   wherein the second access router forwards data to be delivered to the mobile node to the corresponding mobile mode, if the data is received from the first access router.

2. The system of claim 1, wherein the mobile node determines a priority of wireless media and channels to be used during handover based on the received neighbor access router information, selects a target access router by scanning channels according to the determined priority, and performs handover to the selected target access router.

3. The system of claim 1, wherein to exchange access router information with a neighbor access router, the first access router delivers its configuration information to the neighbor access router if a predetermined update period has arrived; determines, if the update period has not arrived, if its configuration element is changed and delivers, if its configuration element is changed, its changed configuration information to the neighbor access router; receives the neighbor access router information; compares the received neighbor access router information with corresponding neighbor access router information stored therein, and updates information related to the corresponding neighbor access router if its configuration information is changed as determined by the comparison.

4. The system of claim 1, wherein the access router information is exchanged between the neighbor access routers using an Access Router Information Protocol (ARIP) packet.

5. The system of claim 4, wherein the ARIP packet includes an ARIP information field including at least one of an address information of an access router, wireless access medium information in use, channel information in use, support information, quality-of-service (QoS) information, authentication information, network prefix information, and voice information.

6. The system of claim 5, wherein the support information includes at least one of fast handover support information and paging support information.

7. A method for performing handover by a mobile node in a wireless network supporting a Mobile IP (Internet Protocol), comprising the steps of:
   sending, when handover is needed, a request for neighbor access router information to an access router currently communicating with the mobile node; and
   upon receiving the neighbor access router information from the access router currently communicating with the mobile node, performing handover to a target access router to which the mobile node will be handed over using the received neighbor access router information:
   wherein configuration information is delivered from the access router currently communicating with the mobile node to a neighbor access router if a predetermined update period has arrived; and
   wherein, if the predetermined update period has not arrived, the access router currently communicating with the mobile node determines if a configuration element is change, and delivers changed configuration information to the neighbor access router if the configuration element is changed.

8. The method of claim 7, wherein the step of performing handover to a target access router using the received neighbor access router information comprises the steps of:
   determining priority of wireless media and channels to be used during handover according to the received neighbor access router information; and
   if a target access router is selected by scanning channels according to the determined priority, performing handover to the selected access router.

9. The method of claim 8, further comprising the step of selecting a target access router by scanning channels according to the next priority if the mobile node fails in selecting a target access router by scanning the determined priority.

10. A method for providing handover of a mobile node in an access router of a wireless network supporting a Mobile IP (Internet Protocol), comprising the steps of:
   exchanging access router information with a neighbor access router; and
   upon receiving a neighbor access router information request from the mobile node, delivering neighbor access router information to the mobile node;

wherein the step of exchanging access router information with a neighbor access router comprises:

delivering configuration information to the neighbor access router if a predetermined update period has arrived, and if the update period has not arrived, determining if a configuration element is changed, and delivering changed configuration information to the neighbor access router if its configuration element is changed; and upon receiving neighbor access router information, comparing the received neighbor access router information with corresponding neighbor access router information stored therein, and updating information on the corresponding neighbor access router if the comparison determines that the neighbor access router information has changed.

11. The method of claim 10, further comprising the step of redirecting data to be delivered to the mobile node to a target access router, upon receiving a fast binding update message from the mobile node.

12. The method of claim 11, further comprising the step of forwarding data to be delivered to the mobile node, received from the access router, to the corresponding mobile node.

13. The method of claim 10, wherein the step of exchanging access router information with a neighbor access router further comprises the steps of:

delivering configuration information to the neighbor access router at predetermined periods; and upon receiving neighbor access router information, comparing the received neighbor access router information with corresponding neighbor access router information stored therein, and updating information related to the corresponding neighbor access router if its configuration information is changed as a result of the comparison.

* * * * *